United States Patent [11] 3,626,997

| [72] | Inventors | William C. Whitaker<br>Richmond;<br>George D. Bryan, Jr., Mechanicsville, both of Va. |
|---|---|---|
| [21] | Appl. No. | 32,194 |
| [22] | Filed | Apr. 27, 1970 |
| [45] | Patented | Dec. 14, 1971 |
| [73] | Assignee | Reynolds Metals Company<br>Richmond, Va. |

[54] METHOD OF AN APPARATUS FOR PACKAGING A FOOD PRODUCT
14 Claims, 3 Drawing Figs.

[52] U.S. Cl.................................................. 141/9,
  53/180, 99/171, 141/100, 141/258, 222/236
[51] Int. Cl....................................................... B65b 1/04,
  B65b 3/04
[50] Field of Search............................................. 141/1, 2, 9,
  10, 11, 59–70, 82, 85–93, 99–107, 113–127,
  313–317, 392, 250–284; 53/180; 99/171; 222/236

[56] References Cited
UNITED STATES PATENTS

| 1,375,674 | 4/1921 | Cobb........................... | 222/236 |
| 3,457,968 | 7/1969 | Tuma........................... | 141/198 |

Primary Examiner—Houston S. Bell, Jr.
Attorney—Glenn, Palmer, Lyne, Gibbs & Thompson ABSTRACT: A method of and apparatus for packaging a food product wherein a slurry of the food product and a brine solution is used to facilitate the advance of the food product. The slurry is collected in a vessel from which a portion of the food product is removed under pressure and delivered to a bag or pouch-forming apparatus. The brine solution is removed from the food product while it is being delivered to the pouch-forming apparatus but is reunited with a brine solution in the pouch-forming apparatus. The latter also includes means for preventing the food product from being entrapped in the seal area of the pouch which would prevent a satisfactory seal from being formed.

INVENTORS
William C. Whitaker
George D. Bryan, Jr.

ATTORNEYS

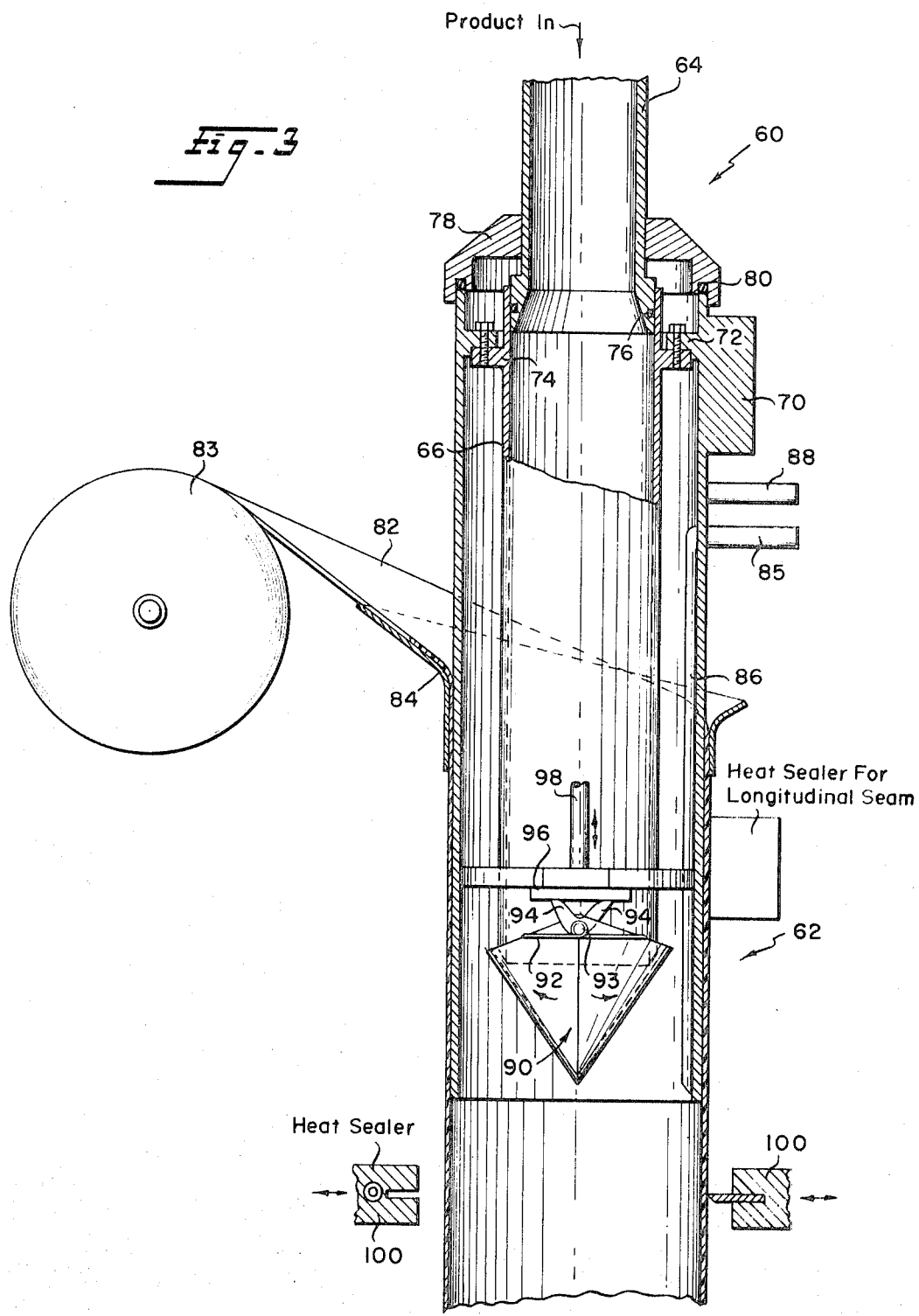

METHOD OF AN APPARATUS FOR PACKAGING A FOOD PRODUCT

This invention relates to a method of and apparatus for packaging a food produce and more particularly to such a method and apparatus wherein the food product is packaged within a flexible pouch together with a brine solution.

Heretofore, it has been recognized to be desirable to be able to use a brine solution in order to advance a food product toward a bag or pouch-forming apparatus wherein the food product and brine are packaged. However, considerable difficulty has been experienced in maintaining the desired consistency of food product and brine as it is being advanced so that a uniformly predictable amount of food product and brine is obtained in the final package.

Another difficulty which has existed in the packaging of a food product in pouches, especially where the food product is inclined to be stringy such as is the case when packaging sauerkraut, is the tendency of the food product to contaminate or extend across the seal area thereby preventing a satisfactory seal from being formed.

In accordance with the present invention these and other problems routinely experienced in the prior art are effectively overcome. Thus the problem of maintaining the consistency of the mixture of the food product in a brine solution is obviated by initially using a slurry to transport the desired food product to a temporary storage vessel closely adjacent the pouch-forming apparatus. The slurry is deposited within the storage vessel and thereafter the food product is separated from the brine and transported to an input conduit of the pouch-forming apparatus. Immediately prior to the encapsulation of the food product is reunited with a solution of brine thereby achieving the desired consistency of food product and brine solution.

The difficulty of contamination of the seal area is avoided by providing the input conduit of the pouch-forming apparatus with means to interrupt the flow of food product during the sealing operation. In a specific embodiment, cam-operated duckbill members are used.

The apparatus includes novel means for removing the food product from the storages vessel and for transporting the food product under a vacuum so as to drain any remnants of brine therefrom prior to insertion of the food product into the input conduit of the pouch-forming apparatus. The apparatus further comprises means for maintaining the consistency of the slurry in the storage vessel substantially constant by stirring the slurry therein.

The pouch-forming apparatus includes a hollow mandrel which is concentrically mounted with respect to the input conduit of the pouch-forming apparatus. A tube carrying the makeup brine solution is supported by the mandrel whereby the brine may be reunited with the food product prior to encapsulation.

The inherent advantages and improvements of the present invention will become more readily apparent upon considering the following detailed description of the invention and by reference to the drawings in which.

While the present invention is described with respect to packaging of a food product, preferably one which is packaged with a brine solution, it will be apparent that features of the invention may be practiced for transporting and/or packaging products other than food products wherein solids and liquids are mixed.

Figure 1:
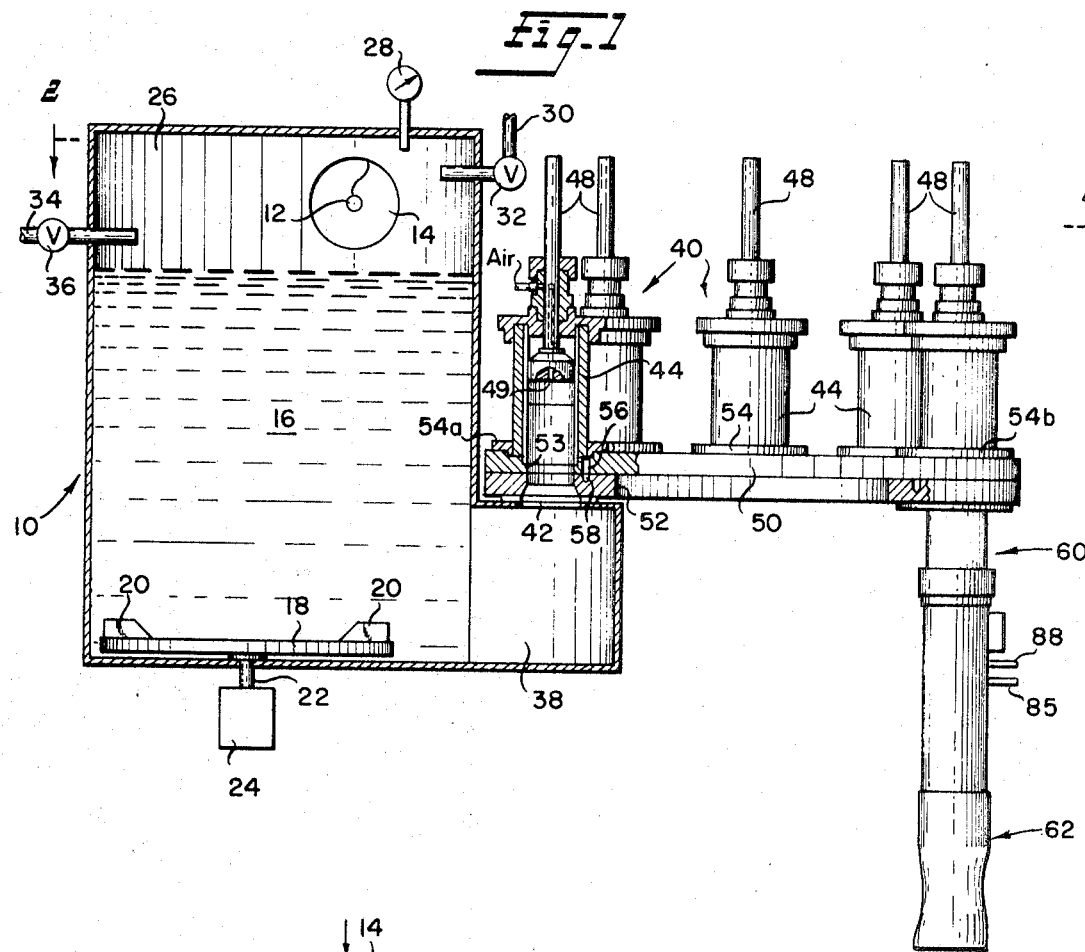
FIG. 1 is a front elevational view, partially in cross section, illustrating a typical arrangement of an apparatus for packaging a food product in accordance with the present invention.
Figure 2:
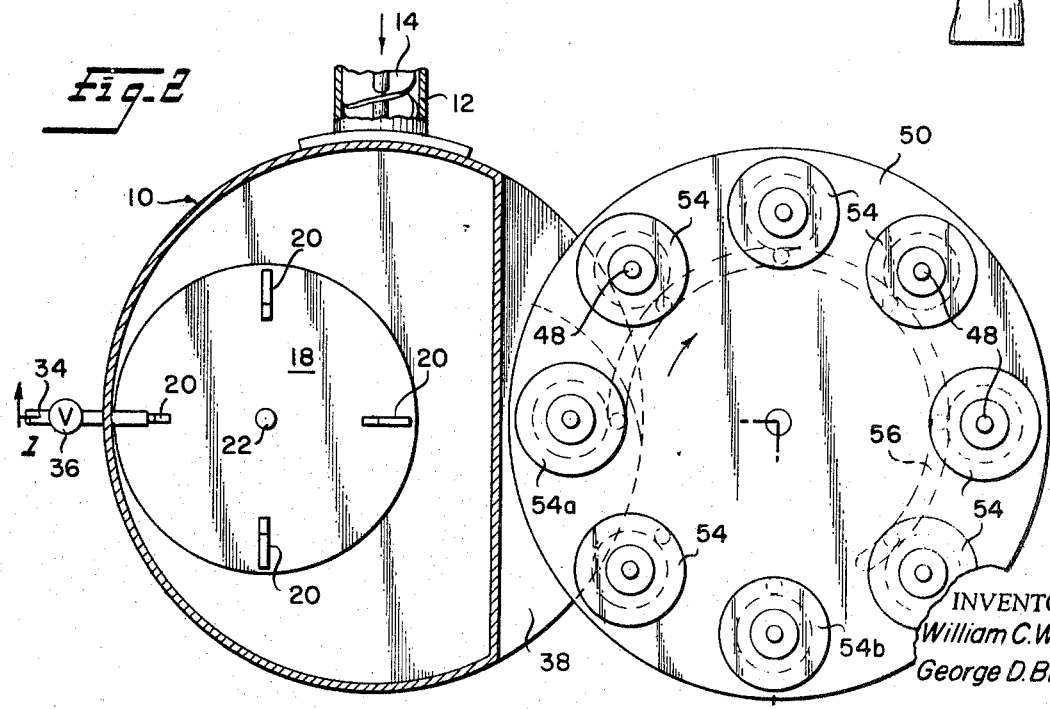
FIG. 2 is a plan view, partially in cross section, taken along line 2—2 of FIG. 1; and, FIG. 3 is a fragmentary view, drawn to an enlarged scale, and partially in cross section, showing a pouch-forming apparatus of the present invention.

Referring now to FIGS. 1 and 2 of the drawings, there is shown a temporary storage vessel, indicated generally at 10. A slurry comprising a food product and a brine solution is fed into vessel 10 through conduit 12 by means of any suitable means such as a screw feed 14. A Moyno pump, for example, is also applicable for this purpose. The slurry itself, indicated by numeral 16 in FIG. 1, is agitated or stirred within storage vessel 10 by means of an agitator 18 having paddles or blades 20 thereon and which rotates about a shaft 22 by means of a motor drive 24.

The storage tank 10 is provided with a head space 26 above the slurry 16 into which projects a pressure gauge 28 and a line control pipe 30 having a valve 32 therein. Pressure gauge 28 and line control 30 with valve 32 permit the maintenance of an overriding pressure within the head space 26 of storage tank 10 by means of which a portion of the food product may be removed from storage tank 10 in a manner described hereinafter.

Head space 26 is further provided with a makeup water pipe 34 which carries a valve 36 therein. Thus it is possible to maintain the consistency of the slurry of food product and brine within vessel 10 within reasonable limits. Vessel 10 is provided with an outlet chamber portion or extension 38 which communicates through an inlet 42 with one of a series of pumps each indicated generally at 40. Each pump 40 has a cylindrical wall 44 in which a piston 46 reciprocates under the influence of a piston rod 48. Each pump is provided with a strainer 45, shown schematically, to isolate the moving parts of the pump from the food product. The pumps 40 are carried and equally spaced on a table or upper plate 50 which is provided with suitable means (not shown) for intermittently advancing the table 50 and thereby advancing each of the pumps 40 thereon. The direction of rotation is clockwise as indicated by the arrow in FIG. 2. Thus, it is possible to index serially the chambers of the pumps 40 over an extension 38 of the vessel 10 into which a portion of the food product may be removed from extension 38 under the influence of the overriding pressure in head space 26 of tank 10.

The inlet 42 to each pump 40 extends through an aperture in lower plate 52 which is torroidal in cross section and also communicates with an aperture 53 in upper plate 50 and thence into the interior of the chamber formed by walls 44 of an individual pump 40. Each pump 40 is mounted to the upper plate 50 by means of an adapter 54 with adapter 54a in FIGS. 1 and 2 being the locus of the inlet of food product from extension 38 into pump 40 and adapter 54b in FIG. 2 being the discharge or outlet adapter position.

Each pump 40 has a variable stroke whereby the volumetric capacity of the chamber into which the portion of food product is received may be varied. Suitable conventional means, such as a Geneva or Ferguson indexing means, are used to index table 50.

In order to help maintain the food product within each pump 40 as it is rotated intermittently from an inlet station at 54a to an outlet or discharge station at 54b, a slight vacuum is established with the food product contained within pump 40. This is effected by means of a series of vacuum ports 56 in upper plate 50 which communicate with a continuous vacuum port 56 which, as shown in FIG. 2, extends from the inlet station at 54a to a position adjacent the outlet station 54b. Any brine which remains in the food product portions which are removed from the extension 38 of vessel 10 under the influence of the overriding pressure in the head space 26 drains therefrom as the removed portions travel from inlet station 54a to the outlet or discharge station 54b.

At the discharge station 54b, the food product is forcibly ejected by means of actuation of piston 46 under the influence of piston rod 48 which may be actuated by suitable means such as a stationary cam, air cylinder or other means, not shown. The food product is thereby discharged into an inlet conduit means indicated generally at 60 in FIG. 1 from which the food product passes such as by gravity into a pouch-forming apparatus indicated generally at 62 in FIGS. 1 and 3.

Reference to FIG. 3 shows the details of the pouch-forming apparatus a feature of which is its ease of disassembly. Upper fill tube means 60 is shown to comprise an upper fill tube 64 which frictionally engages the upper interior surface of lower fill tube 66 which is concentrically mounted within a hollow forming mandrel 68. The hollow forming mandrel 68 is mounted to a rigid support or frame by means of a mounting bracket 70 which may be integrally formed with the forming mandrel 68. Inwardly extending flange members 72 overlap and are aligned with outwardly extending flange members 74 on lower fill tube 66 whereby flanges 72 and 74 may be held together by suitable bolt assemblies. The upper fill tube 64 carries an O-ring seal 76 to provide a seal between the upper fill tube 64 and lower fill tube 66. A mounting cap 78 is frictionally carried by the upper fill tube 64 and serves to prevent foreign matter from entering the space between the upper and lower fill tubes and the hollow forming mandrel 68. An O-ring seal 80 establishes a suitable seal between the mounting cap 78 and the upper extremity of the hollow forming mandrel 68.

A web 82 of pouch-forming material is conventionally fed from a roll 83 over a so-called Leasure collar 84 and advanced exteriorly of the hollow forming mandrel 68. A longitudinal seam is formed in conventional manner as is indicated by the block diagram labeled "Heat Sealer for Longitudinal Seam."

In order to reunite a brine solution with the food product which advances by gravity through the upper and lower fill tubes 64 and 66, a pipe 85 is introduced through a wall of the hollow forming mandrel 68. Pipe 85 is then provided with a portion 86 thereof which lies between the lower fill tube 66 and the hollow mandrel 68 so as to reintroduce measured quantities of brine into each of the pouches which are formed by the pouch-forming apparatus 62. A vent tube 88 extends through the wall of hollow forming mandrel 68 so as to communicate with the passageway between the lower fill tube 66 and hollow forming mandrel 68.

As shown, the upper and lower fill tubes 64, 66 are substantially vertical with the lower end of lower fill tube 66 being provided with means to stop the gravity flow of the food product through the fill tubes and thereby prevent the food product from being trapped in the seal area of the pouches. Specifically, a duckbill construction 90 is provided with each of the duckbills being normally urged together into closed position by a spring loading means 92 which is wrapped around a horizontal axis 93 which serves as a pivot for the duckbills. Formed integrally with the duckbills are camming legs 94 which engage cam plate 96 in order to effect opening and closing of the duckbill construction 90. Cam plate 96 is reciprocated vertically by means of a push rod 98 which is positioned exteriorly of the lower fill tube 66 and within the hollow forming mandrel 68. The hollow mandrel may be provided with a suitable slotted construction, not shown, in order to provide an access through the wall of mandrel 68 to actuate the push rod 98 by means externally thereof and originating at a point above the point at which the web of pouch-forming material 82 engages the exterior surface of the hollow forming mandrel 68. The pouch may be made and sealed in conventional manner such as by means of reciprocable sealing and cutting bars which are indicated schematically at 100. The sealing and cutting bars per se form no part of the present invention.

Each piston rod 48 may be made hollow in the manner indicated by numeral 49 at the fill station in FIG. 1 to admit a blast of air to assist the product in falling through the fill tubes 64, 66 and duckbill construction 90. If desired, steam or an inert gas may be used instead of air to purge the pouch.

In operation, a food product such as sauerkraut and a brine solution is formed into a slurry and advanced through inlet pipe 12 by means of a screw feed 14 into temporary storage tank 10. A pressure in excess of atmospheric pressure, such as 15 pounds per square inch gauge is maintained in head space 26. A pressure range of 10–30 pounds per square inch gauge may be employed in head space 26. The slurry 16 within tank 10 is stirred or kept in a state of agitation by an agitator 18 having paddles or blades 20 thereon. Means are provided for maintaining the consistency of the slurry within tank 10 substantially constant and for maintaining a substantially constant pressure thereover.

A portion of the food product and brine solution is withdrawn from the extension 38 of tank 10 into the inlet 42 of a pump 40 on table 50. As the table is indexed, the lower surface of table 50 in conjunction with the variable position of piston 46 determines the amount of food product retained within the chamber of pump 40. A slight vacuum condition is maintained interiorly of the pump 40 so as to retain the food product therein but permit drainage of any brine solution therefrom. The food product is carried to a discharge section, in this case through 270°, wherein it is forcibly ejected from the pump 40 by actuation of piston rods 48 and piston 46 by suitable means such as a stationary cam.

The food product falls by gravity with or without a blast of air, steam or inert gas, if needed or desired, through suitable conduit means such as upper fill tube 64 and lower fill tube 66 as part of a pouch-forming apparatus. A brine solution is introduced through conduit 85 into the food product which falls through the fill tubes. Means are provided at the bottom of the lower fill tube to cut off the flow of food product through the fill tubes so as to ensure that the food product does not obstruct the sealing and cutoff means 100 of the pouch-forming apparatus with the latter being conventional insofar as the present invention is concerned.

Strainers are employed in pumps 40 to isolate the moving parts thereof from the food product. Also conventional temperature control equipment may be used throughout to maintain the food product at the desired temperature.

While presently preferred embodiments of the invention have been illustrated and described, it will be recognized that the invention may be otherwise variously embodied and practiced within the scope of the claims which follow.

What is claimed is:

1. A method of packaging a food product comprising the steps of
   a. forming a slurry of said food product and brine,
   b. feeding said slurry into a vessel,
   c. removing a portion of said food product and brine from said vessel,
   d. and delivering said portion of said food product to a pouch.

2. A method of packaging a food product as defined in claim 1 including the additional step of draining said brine from said food product in the course of delivering said portion of said food product to said pouch.

3. A method of packaging a food product as defined in claim 1 including the additional step of stirring said slurry in said vessel.

4. A method of packaging a food product as defined in claim 1 including the additional step of maintaining an overriding pressure on said slurry in said vessel.

5. A method of packaging a food product as defined in claim 1 including the additional step of maintaining the solution consistency of said slurry in said vessel substantially constant despite the removal of portions of said food product and brine therefrom.

6. A method of packaging a food product as defined in claim 1 wherein said step of removing a portion of said food product from said vessel includes indexing a series of chambers over a portion of said vessel to receive said food product.

7. A method of packaging a food product as defined in claim 6 including the additional step of varying the volumetric capacity of said series of chambers.

8. A method of packaging a food product as defined in claim 6 wherein said series of chambers is determined in part by apertures in a rotatable table and said method includes rotating said table to sever said removed food product from the food product remaining in said vessel and thereby determine the volume of said food product removed from said vessel.

9. An apparatus for packaging a food product which comprises
   a. first conduit means for containing a slurry of said food product and a brine solution.,
   b. means for feeding said slurry through said conduit means, c. a vessel for receiving said slurry from said conduit means, said vessel having a head space above said slurry therewithin, d. means for establishing a positive pressure in said head space, e. chamber to receive a portion of said slurry from said vessel, f. cutoff means for separating said portion of said slurry from said remainder of said slurry, g. said cutoff means providing transportation for said portion of said slurry with said chamber means, h. and second conduit means for receiving the food product from said portion of said slurry.

10. An apparatus for packaging a food product as defined in claim 9 including means for maintaining the consistency of said slurry in said vessel substantially constant despite the removal of portions thereof from said vessel.

11. An apparatus for packaging a food product as defined in claim 10 wherein said means for maintaining the consistency of said slurry in said vessel substantially constant includes means for stirring said slurry within said vessel.

12. An apparatus for packaging a food product as defined in claim 9 including vacuum means for maintaining the food product in said portion of said slurry within said chamber means during the transportation thereof.

13. An apparatus for packaging the food product as defined in claim 9 wherein said chamber means includes piston means reciprocable therein.

14. An apparatus for packaging a food product as defined in claim 9 wherein said second conduit means comprises an input feed to a pouch.

* * * * *